United States Patent

Warncke et al.

[15] 3,643,511
[45] Feb. 22, 1972

[54] SAMPLE-INLET VALVE FOR GAS CHROMATOGRAPHS

[72] Inventors: Heinz Warncke, Cologne; Melchior Kahl, Leverkusen, both of Germany

[73] Assignee: Farbenfabriken Bayer Aktiengesellschaft, Leverkusen, Germany

[22] Filed: Mar. 20, 1970

[21] Appl. No.: 21,310

[30] Foreign Application Priority Data

Apr. 24, 1970 Germany ............. P 19 20 768.2

[52] U.S. Cl. .......................................... 73/422 GC
[51] Int. Cl. ........................................... G01n 1/10
[58] Field of Search ............................. 73/422 GC

[56] References Cited

UNITED STATES PATENTS

| 3,362,228 | 1/1968 | Stuben | 73/422 |
| 3,401,565 | 9/1968 | Stoll et al. | 73/422 |
| 3,482,450 | 12/1969 | Harris et al. | 73/422 |

*Primary Examiner*—S. Clement Swisher
*Attorney*—Burgess, Dinklage & Sprung

[57] ABSTRACT

A liquid-inlet valve for a gas chromatograph is designed on the principle of a metering rod with a metering groove or bore milled into it, the rod being inserted into a heated evaporator, wherein that part of the valve which is to receive liquid upon loading of the metering groove before insertion into the evaporator, comprises of a solid cylinder of a highly corrosion-resistant material of limited thermal conductivity which seals without lubrication.

11 Claims, 2 Drawing Figures

PATENTED FEB 22 1972

3,643,511

INVENTORS:
HEINZ WARNCKE, MELCHIOR KAHL.
BY
Burgess, Dinklage & Sprung

SAMPLE-INLET VALVE FOR GAS CHROMATOGRAPHS

A SAMPLE-INLET VALVE FOR GAS CHROMATOGRAPHS

One important functional member in a gas chromatograph is the sample-inlet valve. If the samples to be analyzed are liquids, the gas chromatograph has to be fitted with an evaporation chamber in which a precise quantity of the sample liquid is evaporated and mixed with a hot carrier gas. The sample liquid is introduced into the evaporation chamber by means of the sample inlet valve.

In many cases, and especially in process control, analysis is carried out at regular time intervals. Inlet valves for this purpose, which allow the repeated periodic evaporation of a certain amount of liquid, are known as automatic liquid inlet valves. In periodic analyses of this kind, it has been found to be of considerable advantage to use the peaks of the chromatogram for evaluation purposes. In this case, the accuracy and reproducibility of measurement and hence the ability of the apparatus as a whole to be calibrated, are governed to a large extent by the properties of the sample-inlet valve. The sample-inlet valve should allow a high degree of reproducibility and accuracy as regards the volume of liquid introduced into the evaporation chamber. In addition, the total liquid volume should be evaporated as quickly, uniformly and reproducibly as possible.

Hitherto, the most common form of inlet valve has been a slide valve in which a flat slide of polytetrafluoroethylene, which may have a glass powder filler, is displaceably arranged between two jaws of highly alloyed refined steel. Alternatively, a refined steel slide is displaceably arranged between two polytetrafluorethylene jaws. Such a valve normally has to be installed in a hot column oven. As a result, there is a danger of the sample boiling before it is injected, and of the liquid volume introduced containing fluctuating quantities of vapor bubbles. Even specially designed slide valves mounted in the cold zone with the evaporation unit flanged directly to them or with an electrically heated outlet pipe, do not always function reproducibly. Since the slide remains cold, the inevitable result is evaporation that cannot be reproduced as a function of time, leading to nonconstant peaks, or postevaporations which produce double peaks.

Another arrangement uses a circular cross sectioned metering rod or bar into whose surface the metering volume is milled in the form of an annular groove. When the rod is being filled the sample circulates around this metering groove. To inject the sample the rod with the liquid-filled groove is inserted through a stripper ring into the hot evaporator. Unfortunately, known arrangements of this kind have three major disadvantages:

1. Due to the high heat transfer level from the evaporator to the liquid component, the evaporator is undesirably cooled and the liquid sample undesirably heated.
2. Technical difficulties are involved in sealing off the rod from the stripper ring. If the seal is imperfect, the volume of liquid admitted is inaccurate.
3. The carrier gas does not flush out the entire volume of liquid if there is a dead space between the stripper ring and the injection position of the metering groove. Postevaporation occurs, causing double peaks and nonreproducible peaks.

An object of the invention is to develop a new valve design in which the disadvantages referred to are obviated.

According to the invention, this object is achieved by having the liquid part of the valve formed of a solid cylinder of a high corrosion-resistant material of limited thermal conductivity which seals without lubrication.

Advantageously, both ends of the above-mentioned cylinder are provided in known manner with conical lugs so that when the valve is assembled a uniform radial pressure is exerted upon the circular cross-sectional metering rod by a screw collar.

According to another aspect of the invention, capillary bores are provided in the evaporator to guide the carrier gas in such a way the carrier gas is able to flow at a high rate into the entire zone between the stripper and the rest position of the metering groove following injection.

In order to reduce the transfer of heat to the liquid part, the cylindrical evaporator is backed off to limited material thickness on that side nearest the liquid part.

The liquid is introduced into the evaporation zone in known manner by means of a pneumatic plunger drive. The plunger is relatively long and is provided with two plunger or piston rings so that the metering rod is guided precisely. Because of this precision guide, it is possible to use very thin metering rods.

Thus, the invention provides an inlet valve for a gas chromatograph for receiving a sample as liquid and delivering the sample to the chromatograph as gas. The device comprises a liquid-receiving section and an evaporating section, and a metering rod having a metering groove for receiving the sample. The metering rod is mounted in the valve for sliding to reciprocate the metering groove between a liquid-loading position in the liquid-receiving section and a liquid-evaporating position in the evaporating section. Means are provided for sliding the metering rod as aforesaid. The liquid-receiving section includes a body member in which said metering rod is slidably mounted, for said sliding movement, and which comprises means defining said liquid-loading position, and includes a liquid inlet and a liquid outlet for flow of liquid to and from said loading position for filling of the metering groove. The body member is in direct sliding surface engagement with the metering rod for lubricating and sealing of the metering rod.

One embodiment of the invention is described by way of example in the following with reference to the accompanying drawings, wherein.

Figure 1:
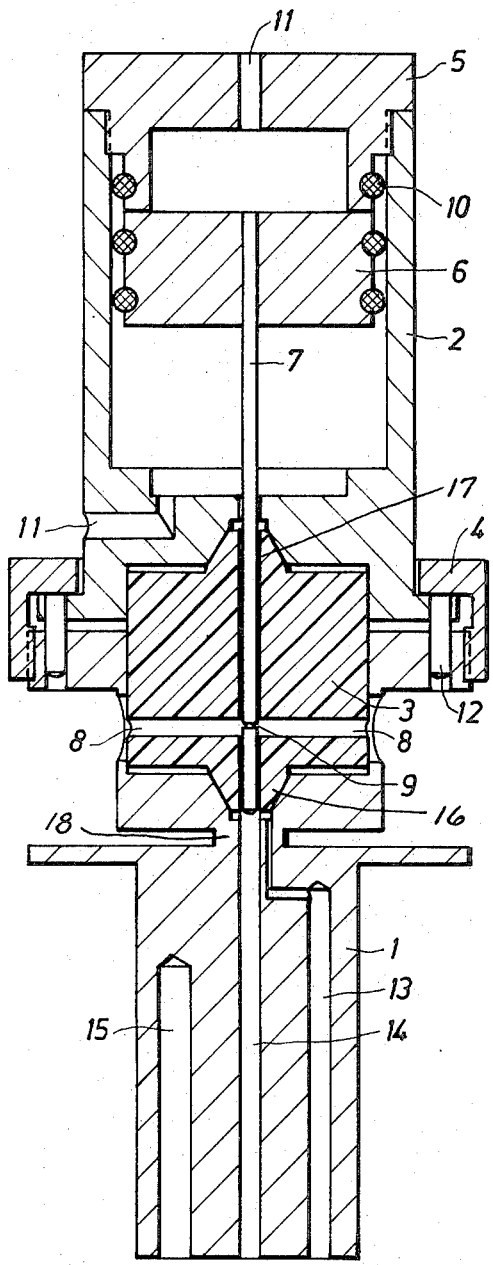
FIG. 1 is a longitudinal section through the inlet valve with a liquid region and an evaporation region, the metering groove having been brought into the filling position.

The most important part of the inlet valve is an adapter or body member 3 which comprises a cylinder with conical lugs 16 and 17 on its two end faces. The cylinder is made of a highly corrosion-resistant material of limited thermal conductivity which does not require any lubrication (preferably glass-powder-filled polytetrafluoroethylene). The adapter 3 has an axial bore, in which a circular metering slide 7 is arranged to slide. The metering slide is made of a corrosion-resistant metal adapted to the measuring liquid or of a suitable high-strength metal alloy and the diameter of the slide is small. This ensures rapid heating in an electrically heated evaporator 1.

Figure 2:
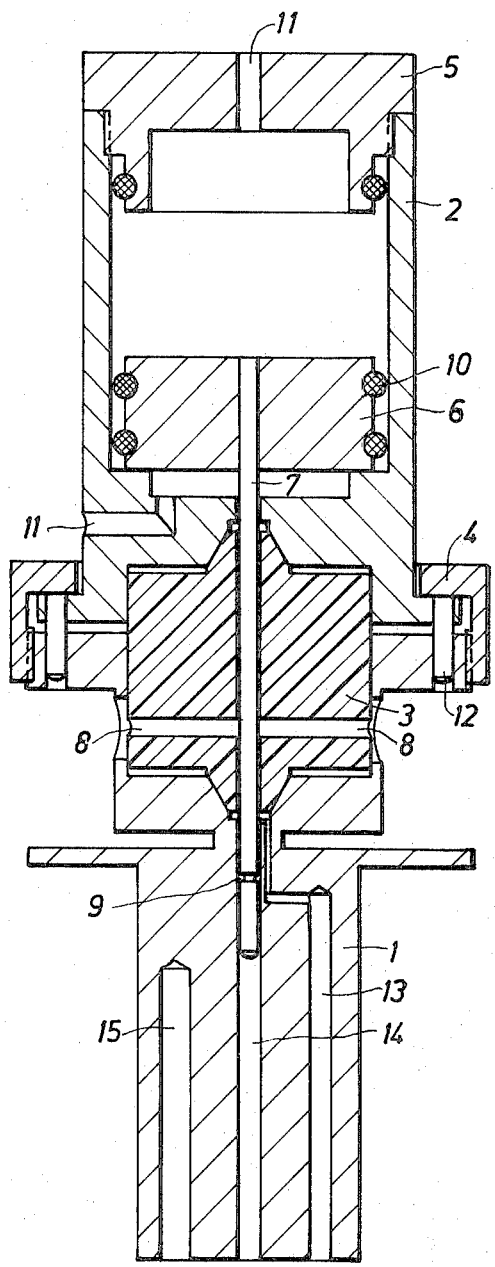
FIG. 2 shows the same valve in the injection position.

The adapter 3 has two radial inlet and outlet bores 8 through which a stream of sample liquid is guided for filling of the metering groove 9. The internal diameter of these bores is slightly larger than the external diameter of the metering slide 7. In this way, the sample liquid is able to circulate freely around the metering groove 9 in the filling position (FIG. 1), while the stream of sample liquid is not interrupted in any way when the device is in the injection position (FIG. 2). This also has the advantage that salt deposits which are sometimes formed in the metering groove during evaporation, can be readily dissolved and flushed out in the filling position. An annular metering groove 9 of the required injection volume (approximately 1 microliter) is milled into the metering slide 7. In the filling position, FIG. 1, this groove 9 is exactly level with the sample supply bores 8 and during injection is moved into the evaporator 1.

The adapter 3, which is contained in a two-piece housing as shown, is screwed to the evaporator 1 by means of a pneumatic drive cylinder 2 and a threaded ring 4. By virtue of the frustoconical ends 16 and 17 of the adapter, a uniform radial pressure is exerted by the adapter upon the metering slide on all sides during assembly. This ensures a satisfactorily seal between the sample stream, the carrier gas stream and the atmosphere. This arrangement also provides for a permanent seal without any need for the valve to be opened during operation. To avoid deformation, the adapter 3 is held in a hollow cylinder of refined steel attached to the evaporator 1 and the walls of said cylinder are made very thin to reduce heat transfer. In order further to reduce the transfer of heat from the evaporator section 1 to the liquid-receiving section housing the adapter 3, the evaporator 1 is backed off to a limited material thickness, i.e., these sections are joined by a thin neck 18. The carrier gas is guided along a bore 13, heated in the evaporator 1, blown at a high rate against the end face of the adapter 3 adjacent the evaporator section, through a capillary bore in the neck 18 of the evaporator 1 and as a result is deflected through 180°. The high rate of flow of the carrier gas in the bore prevents the sample from flowing back in the carrier gas feed pipe during evaporation. This arrangement also provides for thorough rinsing of the dead space between the end of the adapter 3 and the injection position of the metering groove 9.

A pneumatic driving piston 6 is sealed in its cylinder with two O-rings 10 arranged far enough apart to ensure that the metering slide 7 is safely guided. A lateral compressed air connection 11 is provided in a member 5 for returning the piston 6 to the filling position is arranged in such a way that, when compressed air is admitted, no one-sided pressure is exerted on the piston 6, thus preventing the piston from tilting and the metering slide 7 from buckling. Pins 12 prevent the cylinder 2 and hence the adapter 3 from turning when the threaded ring 4 is tightened. The end of the slide 7 remote from the piston 6 slides in a bore 14 in the evaporator.

A bore 15 in the evaporator 1 is used to accommodate a heating cartridge. Another axial bore which cannot be seen in the section illustrated contains a resistance thermometer for regulating the temperature of the evaporator. This temperature control is essential for obtaining reproducible evaporation during injection.

We claim:

1. In an inlet valve for a gas chromatograph for receiving a sample as liquid and delivering the sample to the chromatograph as gas comprising:
   a liquid-receiving section and an evaporating section,
   a metering rod having a metering groove for receiving the sample and being mounted in the valve for sliding to reciprocate the metering groove between a liquid-loading position in the liquid-receiving section and a liquid-evaporating position in the evaporating section,
   means for sliding the metering rod as aforesaid,
   said liquid-receiving section including a body member in which said metering rod is slidably mounted for said sliding movement and which comprises means defining said liquid-loading position and includes a liquid inlet and a liquid outlet for flow of liquid to and from said loading position for filling of the metering groove, said body member being in direct sliding surface engagement with the metering rod for lubricating and sealing of the metering rod,
   the improvement which comprises:
   the body member having a conical lug at the side facing the evaporation section receiving the metering rod where the metering rod enters the body member from the evaporation section side, the valve including means pressing the lug against the metering rod.

2. A valve according to claim 1, said body member being contained in a two-piece housing, said housing pieces being secured together by a threaded ring.

3. A valve according to claim 1, the evaporator section comprising a capillary bore for passage of carrier gas for evaporating liquid sample from the periphery of the body member adjacent the evaporator section to and through the liquid evaporating position.

4. A valve according to claim 3,
   the liquid-receiving section and the evaporator section being interconnected by a thin neck reducing heat transfer between said sections;
   said means for sliding the metering rod comprising a piston-cylinder combination, the metering rod being connected to the piston for movement thereby, the piston being outfitted with two axially spaced piston rings for precise guiding of the piston and metering rod permitting use of a metering rod of small diameter.

5. A valve according to claim 1, the liquid-receiving section and the evaporator section being interconnected by a thin neck reducing heat transfer between said sections.

6. A valve according to claim 1, said means for sliding the metering rod comprising a piston-cylinder combination, the metering rod being connected to the piston for movement thereby, the piston being outfitted with two axially spaced piston rings for precise guiding of the piston and metering rod permitting use of a metering rod of small diameter.

7. A valve according to claim 1, said body member being contained in a two-piece housing, said housing pieces being secured together by a threaded ring.

8. A valve according to claim 7,
   the evaporator section comprising a capillary bore for passage of carrier gas for evaporating the liquid sample from the periphery of the body member adjacent the evaporator section to and through the liquid-evaporating position; the liquid-receiving section and the evaporator section being interconnected by a thin neck reducing heat transfer between said sections;
   said means for sliding the metering rod comprising a piston-cylinder combination, the metering rod being connected to the piston for movement thereby, the piston being outfitted with two axially spaced piston rings for precise guiding of the piston and metering rod permitting use of a metering rod of small diameter.

9. In an inlet valve for a gas chromatograph for receiving a sample as liquid and delivering the sample to the chromatograph as gas comprising:
   a liquid-receiving section and an evaporating section,
   a metering rod having a metering groove for receiving the sample and being mounted in the valve for sliding to reciprocate the metering groove between a liquid-loading position in the liquid-receiving section and a liquid-evaporating position in the evaporating section,
   means for sliding the metering rod as aforesaid,
   said liquid-receiving section including a body member in which said metering rod is slidably mounted for said sliding movement and which comprises means defining said liquid-loading position and includes a liquid inlet and a liquid outlet for flow of liquid to and from said loading position for filling of the metering groove, said body member being in direct sliding surface engagement with the metering rod for lubricating and sealing of the metering rod,
   the improvement which comprises:
   a capillary bore in the evaporation section for passage of carrier gas for evaporating the liquid sample from the periphery of the metering rod adjacent the body member to and through the liquid-evaporating position.

10. A valve according to claim 9, the liquid-receiving section and the evaporator section being interconnected by a thin neck reducing heat transfer between said sections.

11. In an inlet valve for a gas chromatograph for receiving a sample as liquid and delivering the sample to the chromatograph as gas comprising:
    a liquid-receiving section and an evaporating section,
    a metering rod having a metering groove for receiving the sample and being mounted in the valve for sliding to reciprocate the metering groove between a liquid-loading position in the liquid-receiving section and a liquid-evaporating position in the evaporating section,
    means for sliding the metering rod as aforesaid,
    said liquid-receiving section including a body member in which said metering rod is slidably mounted for said sliding movement and which comprises means defining said liquid-loading position and includes a liquid inlet and a liquid outlet for flow of liquid to and from said loading position for filling of the metering groove, said body member being in direct sliding surface engagement with the metering rod for lubricating and sealing of the metering rod, the improvement comprising:

the metering rod passing through the body member, the body member having a conical lugs receiving the metering rod where the metering rod enters the body member, the valve including means pressing the lugs against the metering rod.

* * * * *